United States Patent Office 3,684,658
Patented Aug. 15, 1972

3,684,658
ENZYMES AND PROCESS FOR THEIR PREPARATION
Per Staffan Delin, Karl Hans Fritz Kiessling, Karl Hugo Thelin, and Lars Sölve Nathorst-Westfelt, Sodertalje, Sweden, assignors to Astra Lakemedel Aktiebolag, Sodertalje, Sweden
Filed Apr. 3, 1970, Ser. No. 25,454
Claims priority, application Great Britain, Apr. 10, 1969, 18,582/69; Feb. 25, 1970, 9,179/70
Int. Cl. C12d 13/10
U.S. Cl. 195—62     16 Claims

ABSTRACT OF THE DISCLOSURE

Novel proteolytic, hydrolytic enzymes by cultivation of a new strain of Streptomyces globisporus are produced. The new enzymes are useful as ingredients in detergent compositions, as agents for cell lysis, and for solubilization of biopolymers.

BACKGROUND OF THE INVENTION

(1) Field of the invention

The present invention relates to new and valuable hydrolytic enzymes and to methods for their preparation, isolation and purification. More particularly, this invention is concerned with proteolytic enzymes obtainable by cultivation of a newly discovered strain of Streptomyces globisporus and to methods for the recovery of the desired products by cultivation of said organism. In another aspect, the present invention relates to the use of the proteolytic enzymes in various fields of technology. Examples of such applications are the use of the products of the invention as ingredients in detergent compositions, the use as agents for cell lysis, and the use of the products in solubilization of biopolymers.

(2) Description of the prior art

Chemical compounds, including antibiotics and such specific chemical compounds as hypoxanthine and nicotinamide dinucleotide, have been produced by cultivating specific microorganisms. The compounds produced are particularly dependent on the strain employed. Strains of Streptomyces globisporus are known. Such strains however fail to have the characteristics of the strain to which the present invention relates.

SUMMARY OF THE INVENTION

It is an object of our invention to provide a new strain of Streptomyces globisporus.
It is another object of our invention to provide new and valuable hydrolytic enzymes.
It is a further object of our invention to provide methods for preparation, isolation and purification of new and valuable hydrolytic enzymes.
Yet another object of our invention concerns the use of new and valuable hydrolytic enzymes as ingredients in detergent compositions, as agents for cell lysis, and as agents in solubilization of biopolymers.

Other objects and advantages of our invention will become apparent to those skilled in the art from the following description and examples.

For production of our novel and valuable hydrolytic enzymes, we have isolated a microorganism from a soil sample collected in Sodertalje, Sweden. The taxonomic features of the organism, hereinbelow denoted Astra strain 19, have been investigated according to Bergey's Manual of Determinative Bacteriology, 7th ed., Baltimore; Williams & Wilkins, 1957, and Selman A. Waksman's The Actinomycetes, vol. II, Baltimore; Williams & Wilkins, 1961, and found to be characteristic of those of the species Streptomyces globisporus.

A survey of the literature failed to reveal known strains of Streptomyces globisporus which satisfactorily agree with the characteristics hereinafter set forth, and the organism of the present invention is accordingly deemed to be a new strain.

The taxonomic investigation of the microorganism was carried out according to methods described in Bergey's Manual of Determinative Bacteriology, 7th ed., Baltimore; Williams & Wilkins, 1957, and Selman A. Waksman, The Actinomycetes, vol. II, Baltimore; Williams & Wilkins, 1961. The following results were obtained:

Vegetable growth: Flat, colourless colonies. No or a slightly yellow, diffusible pigment formed.

Well developed aerial mycelium, especially on synthetic agar like starch-$KNO_3$ agar. The aerial mycelium is powdery, white, sometimes slightly yellow with a gray tinge when the spores are formed.

The sporophores are straight, forming brooms.
The spores are spherical, 0.8–1.0 micron in diameter.
Milk is rapidly peptonized, giving a slightly alkaline reaction.
Gelatin is slowly liquified.
Starch is hydrolyzed.
Growth is fair on cellulose.
Growth is good on sucrose and glucose.
No antagonistic properties have been observed.
On potato only a trace of aerial mycelium is formed at 28° but abundant sporulation takes place at 22°. At all the investigated temperatures the growth is becoming brown but no soluble pigments have been observed.

The microorganism Astra strain 19 when cultured in organic media has been found capable of producing several hydrolytic enzymes like proteases, amylases, and lipases. The enzymes may be used as ingredients in detergent compositions, as agents for cell lysis, and for solubilization of biopolymers. Of special interest are proteases produced by the organism in question, which are stable at elevated temperatures and thus are particularly suitable as ingredients in detergent compositions. The stability and activity of these proteases seem to be independent of the concentration of calcium ions, $Ca^{2+}$, and other ions present in a solution containing the proteases. Such properties are particularly advantageous in use of the proteases as additives to detergent compositions. Another property of the proteases which is especially valuable for their use as additives to detergent compositions is their fairly high pH optimum.

The particular fields of technology mentioned above wherein the enzymes of the present invention might find useful applications are only intended to be illustrative examples of areas of utility, and it will be understood that enzymes having the highly valuable and unexpected properties described more in detail below may have numerous other technological applications, all of which will be included within the scope of this invention.

One further area of utility for the enzymes of the present invention is food processing for example for modification of gluten in baking processes.

In a broad embodiment of our process which suitably may be used for the production of the enzymes of the present invention, the organism in question is grown under aerobic submerged conditions in a suitable nutrient medium. It is preferred that the nutrient medium contains an assimilable source of carbon, nitrogen and inorganic salts. Growth conditions such as time, temperature and hydrogen ion concentration may be varied broadly without departing from the scope of the invention. At the conclusion of the growth period the enzymes or material of interest may be recovered from the mash by a number of methods, such as centrifugation of the mash, dialyzing the solution and spray-drying the resulting solution.

A wide variety of substances may be used as sources of carbon in the nutrient medium. These may be either soluble or insoluble in water, it being desirable only that the compounds used be readily assimilable by the organism. As examples may be given the pentoses such as arabinose, ribose and xylose; the monosaccharides such as mannose, levulose and galactose; the disaccharides such as trehalose, maltose, lactose, cellobiose and sucrose; the polysaccharides such as starch, the higher alcohols such as glycerol, mannitol, sorbitol and inositol; and miscellaneous sources such as ethyl alcohol and calcium carbonate. Nitrogen in an assimilable form may be provided by animal or vegetable proteins, soybean meal, casein, peptones, polypeptides, or amino acids.

Adjustment of the pH may be accomplished with any suitable base such as sodium hydroxide, phosphate buffer, sodium citrate, sodium acetate or any other suitable material which would bring the pH within the desired range.

The temperature of the nutrient medium during fermentation of the fungus may advantageously be maintained between about 26 and 30° C.

The time required for the production of a maximum amount of proteolytic enzymes may be widely varied, depending upon the nature of the particular ingredients employed in the nutrient medium. However, a period from about 70 to about 160 hours is usually considered adequate.

Anti-foaming agents may be added to the fermentation medium. Examples of anti-foaming agents are soybean oil, castor oil, sulfonated oils, lard oil, brominated castor oil.

As is stated above, the new strain of Streptomyces globisporus disclosed herein can be grown in a culture medium to produce hydrolytic enzymes. The culture medium can be any one of a number of media known in the art since the organism in question is capable of assimilating many energy sources. In order to achieve good production economy and maximum yield of enzymes, however, certain culture media are preferred. For example, the presently preferred sources of carbohydrates in the culture medium are sucrose, starch, glucose, dextrin, molasses and the like. The preferred sources of nitrogen are soybean meal, brewers yeast, corn steep liquor, casein, fishmeal, Scotaferm® obtained from Distillers, Pharmamedia® and the like. The nutrient organic salts which can be incorporated in the medium include the salts capable of yielding ions such as ammonium, sodium, potassium, calcium, magnesium, phosphate, chloride, sulphate, nitrate, and the like. Trace elements may also be included in the culture medium. Such trace elements are, however, usually present as impurities in other components in the culture medium.

For maximum growth and production of Astra strain 19 the culture medium, prior to inoculation, should be adjusted to a pH between about 6.0 and about 7.5, preferably to pH 6.8. The pH at the end of the growth period will depend on the buffering substances present and on the initial pH.

The rate of production of proteases in the culture medium is readily followed during the growth period of the organism by testing samples from the medium for their caseinolytic activity. The caseinase determinations are described more in detail below.

The crude product obtained after isolation of the enzyme preparation obtained in the cultivation of Astra strain 19 is characterized in (a) being a mixture of proteins;
(b) being soluble in water, saline solutions and conventional buffer solutions;
(c) being stable and retaining its enzymatic activity at room temperature for more than a year in dry powder form;
(d) its ultraviolet absorption spectrum being that characteristic of proteins containing aromatic amino acids;
(e) being proteolytically active against casein, hemoglobin and gelatin;
(f) having a proteolytic optimum with casein as substrate at pH 9–10;
(g) being able to hydrolyze N-α-tosyl-L-arginine ethyl ester (TAEE);
(h) containing proteolytic activity being induced by heating;
(i) containing esterases, lipases and amylases besides proteolytic enzymes;
(j) the heat stable enzyme or enzymes being precipitable with organic solvents or ammonium sulphate;
(k) its stability and activity being essentially independent of the concentration of calcium ions in a solution at elevated temperature;
(l) the mixture having a temperature optimum with casein as substrate at about 60° C. at pH 7.4 and a temperature optimum at about 50° C. at pH 9.0;
(m) the mixture having a temperature optimum with TAEE as substrate around 50° C. at pH 7.4.

The expressions "crude product," first acetone precipitate" and "second acetone precipitate" which occur in this application are used to denote the various products obtained in the isolation and purification of the enzyme preparation obtained at the cultivation of Astra strain 19 and are defined by the manner in which they are prepared as described in Example 8.

The present invention will be further explained by means of the following tables and drawings.

In said annexed drawings.

Additional details of said figures are provided hereafter.

Table 1 shows the pH optimum of the protease activity (a) in the crude product obtained at the isolation of the enzyme preparation;
(b) in the first acetone precipitate; and
(c) in the second acetone precipitate. The measurements of the proteolytic activity were made at 37° C. using casein as substrate and at 40° C. using N-α-tosyl-L-arginine-ethyl-ethyl-ester (TAEE).

TABLE 1.—pH OPTIMUM OF PROTEOLYTIC ACTIVITY

| | Percent of maximum proteolytic activity | | | |
|---|---|---|---|---|
| | Casein as substrate | | | TAEE as substrate crude product |
| pH | Crude product | First acetone precipitate | Second acetone precipitate | |
| 4.0 | | | | 4 |
| 5.0 | | | | 5 |
| 6.0 | 38 | 44 | 36 | 15 |
| 7.0 | 16 | 55 | 64 | 45 |
| 8.0 | 81 | 78 | 76 | 92 |
| 8.5 | | | | 95 |
| 9.0 | 100 | 97 | 95 | 100 |
| 10.0 | 89 | 100 | 100 | 55 |
| 10.5 | | | | 42 |
| 11.0 | 31 | 69 | 47 | |

Table 2 shows the heat stability at pH 7.4 and at pH 9.0 of (a) the crude product obtained at the isolation of the enzyme preparation;
(b) the first acetone precipitate; and
(c) the second acetone precipitate.

The samples were incubated without substrate at the indicated pH and temperature for 30 minutes. The determination of proteolytic activity was thereafter carried out at a temperature of 37° C. using casein as substrate.

TABLE 2.—HEAT STABILITY

| | Percent of maximum activity | | | | |
|---|---|---|---|---|---|
| | pH 7.4 | | pH 9.0 | | |
| Temperature, °C. | Crude product | First acetone precipitate | Crude product | First acetone precipitate | Second acetone precipitate |
| 20 | 100 | 100 | 100 | 98 | 100 |
| 37 | 94 | 99 | 73 | 100 | 76 |
| 50 | 87 | 95 | 13 | 87 | 52 |
| 60 | 20 | 82 | 10 | 66 | 50 |
| 70 | 15 | 78 | 6 | 57 | 45 |
| 80 | 13 | 77 | 2 | 3 | 31 |
| 90 | | 2 | | 2 | 5 |
| 100 | | 3 | | 0 | 2 |

Table 3 shows the temperature optimum at pH 7.4 and pH 9.0 of (a) the crude product obtained at the isolation of the enzyme preparation;
(b) the first acetone precipitate; and
(c) the second acetone precipitate.

Casein was used as substrate at the activity measurements at pH 7.4 and 9.0. The time for activity determination was 15 minutes. TAEE was also used as substrate at 7.4.

TABLE 3.—TEMPERATURE OPTIMUM OF PROTEOLYTIC ACTIVITY

| | Percent of maximum activity | | | | | | | | |
|---|---|---|---|---|---|---|---|---|---|
| | Casein as substrate | | | | | | TAEE as substrate: pH 9.4 | | |
| | pH 7.4 | | | pH 9.0 | | | | | |
| Temperature, °C. | Crude product | First acetone precipitate | Second acetone precipitate | Crude product | First acetone precipitate | Second acetone precipitate | Crude product | First acetone precipitate | Second acetone precipitate |
| 20 | 29 | 14 | 6 | 35 | 8 | 10 | 39 | 53 | 48 |
| 37 | 28 | 15 | 45 | 46 | 25 | 50 | | | |
| 40 | | | | | | | 49 | 69 | 77 |
| 50 | 76 | 51 | 100 | 100 | 66 | 100 | 100 | 92 | 100 |
| 60 | 100 | 77 | 96 | 70 | 76 | 52 | 39 | 100 | 58 |
| 70 | 80 | 93 | 70 | 77 | 87 | 57 | 0 | 29 | 0 |
| 80 | 84 | 100 | 72 | 79 | 100 | 55 | | | |
| 90 | 30 | 53 | 56 | 27 | 35 | 15 | | | |
| 100 | 10 | 14 | 14 | 7 | 9 | 0 | | | |

Table 4 shows the relationship between proteolytic activity and time and temperature for incubation of crude product obtained at the isolation of the enzyme preparation. The proteolytic activity is measured as the light absorption at 280 nm., which is proportional to the proteolytic activity. The test was carried out by incubating the test sample, 10 mg. per ml., for the indicated number of minutes whereafter the proteolytic activity was measured with casein as substrate at pH 7.4. The proteolytic activity was measured on an aliquot of the incubation mixture.

TABLE 4.—RELATIONSHIP BETWEEN HEAT STABILITY TIME FOR INCUBATION AND TEMPERATURE

| | Optical density of trichloroacetic acid soluble material | | | | |
|---|---|---|---|---|---|
| Incubation time (min.) | Temperature (° C.) | | | | |
| | 50 | 60 | 65 | 70 | 75 |
| 0 | 1.503 | 1.364 | 1.456 | 1.389 | 1.318 |
| 5 | 1.540 | 1.236 | 1.299 | 1.042 | .612 |
| 10 | 1.503 | 1.191 | 1.075 | .708 | .242 |
| 15 | 1.495 | 1.193 | 0.930 | .504 | .217 |
| 17 | 1.475 | 1.102 | .885 | .443 | .212 |
| 20 | 1.530 | 1.103 | .833 | .397 | .197 |
| 22 | 1.513 | 1.060 | .871 | .353 | .165 |
| 25 | 1.540 | 1.110 | .838 | .320 | .173 |
| 27 | 1.517 | 1.059 | .838 | .299 | .172 |
| 30 | 1.613 | 1.100 | .802 | .314 | .181 |
| 32 | 1.478 | 1.063 | .743 | .297 | .181 |
| 35 | 1.523 | 1.064 | .698 | .255 | .180 |
| 37 | 1.490 | 1.038 | .662 | .240 | .164 |
| 40 | 1.538 | 1.039 | .636 | .240 | .164 |
| 42 | | | .574 | .210 | .136 |
| 45 | 1.548 | 1.033 | .581 | .234 | .184 |
| 47 | | | .529 | .218 | .133 |
| 50 | 1.520 | .996 | .539 | .196 | .151 |
| 52 | | | .501 | .202 | .149 |
| 55 | 1.468 | 1.003 | .499 | .195 | .125 |
| 60 | 1.525 | | | | |

Table 5 shows the relationship between proteolytic activity, time and pH at 65° C. for the crude product. The buffer used for the incubation was Teorell-Stenhagen universal buffer. The test was carried out by incubating the test sample, 10 mg. per ml., for the indicated number of minutes at the indicated pH whereafter the proteolytic activity was measured at pH 7.4 with casein as substrate as the light absorption at 280 nm., which is proportional to the proteolytic activity. The proteolytic activity was measured on an aliquot of the incubation mixture.

TABLE 5.—RELATIONSHIP BETWEEN PROTEOLYTIC ACTIVITY, TIME FOR INCUBATION AND pH AT 65° C. FOR THE CRUDE PRODUCT

| | Optical density of trichloroacetic acid soluble material | | | | | | |
|---|---|---|---|---|---|---|---|
| Incubation time (min.) | pH 4 | pH 5 | pH 6 | pH 7 | pH 8 | pH 9 | pH 10 |
| 0 | .471 | .501 | .526 | .540 | .525 | .201 | .180 |
| 5 | .127 | .456 | .462 | .450 | .136 | .094 | .069 |
| 10 | .078 | .405 | .418 | .338 | .112 | .097 | .072 |
| 15 | .071 | | .370 | .262 | .115 | .091 | .062 |
| 17 | .068 | .342 | .350 | .265 | .092 | .064 | .062 |
| 20 | .056 | .312 | .334 | .219 | .084 | .075 | .074 |
| 22 | .058 | .301 | .303 | .194 | .078 | .066 | .063 |
| 25 | .050 | .278 | .282 | .182 | .067 | .082 | .054 |
| 27 | .043 | .274 | .277 | .166 | .082 | .075 | .058 |
| 30 | .035 | .270 | .252 | .134 | .093 | .076 | .052 |
| 32 | .051 | .257 | .241 | .144 | .115 | .078 | .044 |
| 35 | .025 | .242 | .231 | .158 | .105 | .083 | .026 |
| 37 | .022 | .230 | .218 | .117 | .105 | .078 | .034 |
| 40 | .039 | .219 | .215 | .105 | .101 | .086 | .043 |
| 42 | .048 | .224 | .210 | .113 | .092 | .077 | .032 |
| 45 | .034 | .209 | .188 | .116 | .091 | .084 | .043 |
| 47 | .034 | .200 | .180 | .106 | .086 | .072 | .037 |
| 50 | .027 | .212 | .171 | .104 | .089 | .065 | .040 |
| 52 | .030 | .209 | .142 | .089 | .084 | .075 | .031 |
| 55 | .033 | .216 | .142 | .081 | .070 | .054 | .040 |

Table 6 shows the pH stability of the crude product and of the first acetone, precipitate, further purified by ion exchange chromatography on DEAE cellulose (see Table 9), using 0.01 M $CH_3COONH_4$ pH 7.2 as eluting agent. The enzyme preparations were incubated for 30 minutes at 37° C. in Teorell-Stenhagen buffer adjusted to the desired pH. At the end of the incubation the samples were mixed with phosphate buffer of pH 7.4 and the remaining activity determined by casein digestion.

TABLE 6.—pH STABILITY OF CRUDE PRODUCT AND FIRST ACETONE PRECIPITATE

| pH | Percent of maximum activity | |
|---|---|---|
| | Crude product | First acetone precipitate eluted from DEAE-cellulose |
| 2 | 4 | 99 |
| 3 | 4 | 97 |
| 4 | 37 | 90 |
| 5 | 70 | 92 |
| 6 | 97 | 93 |
| 7 | 100 | 100 |
| 8 | 93 | 96 |
| 9 | 90 | 95 |
| 10 | 50 | 95 |
| 11 | 14 | 86 |

Figure 2:
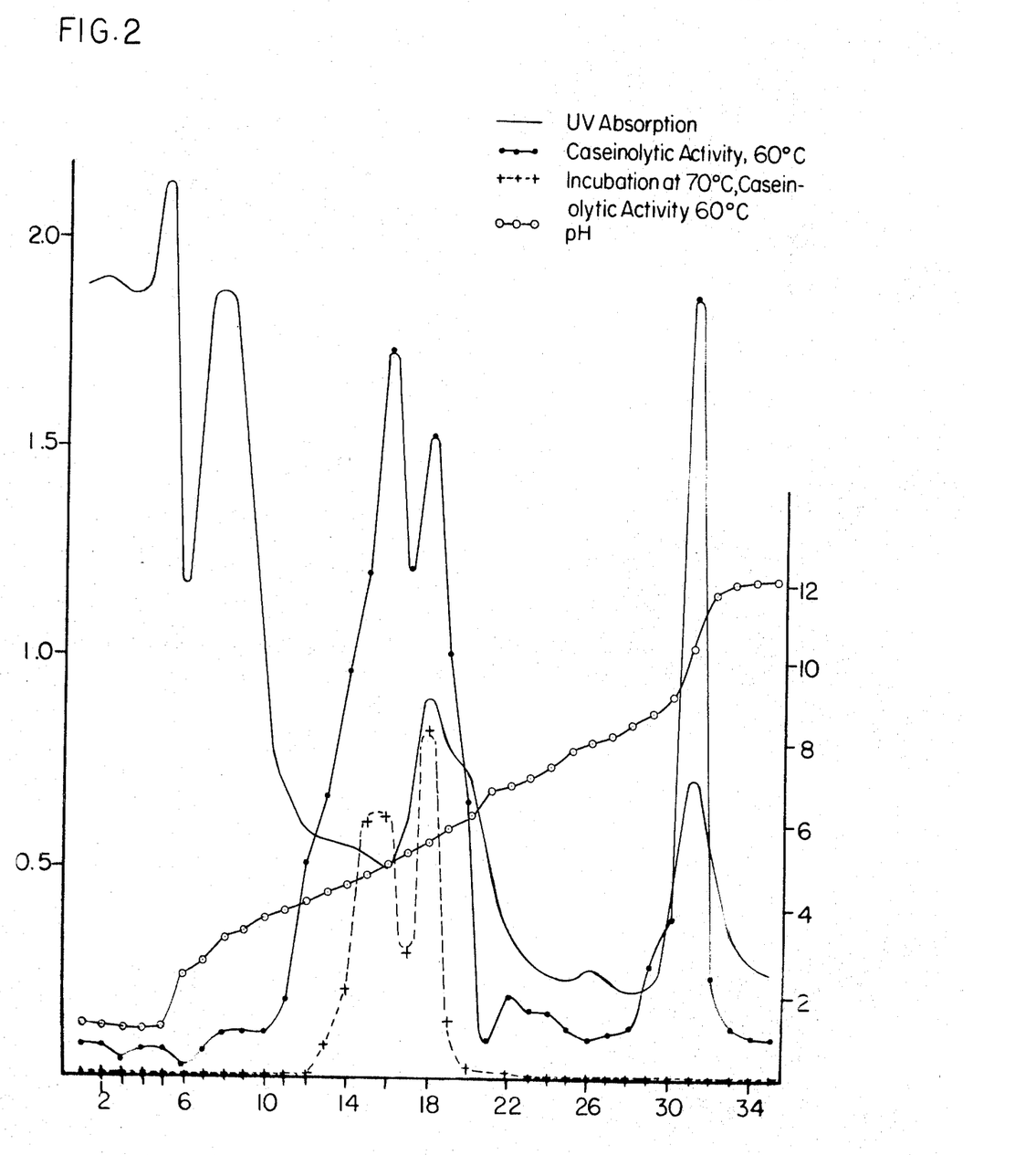
FIG. 2 relates to the isoelectric separation of the heated crude enzyme preparation of our invention.
Figure 3:
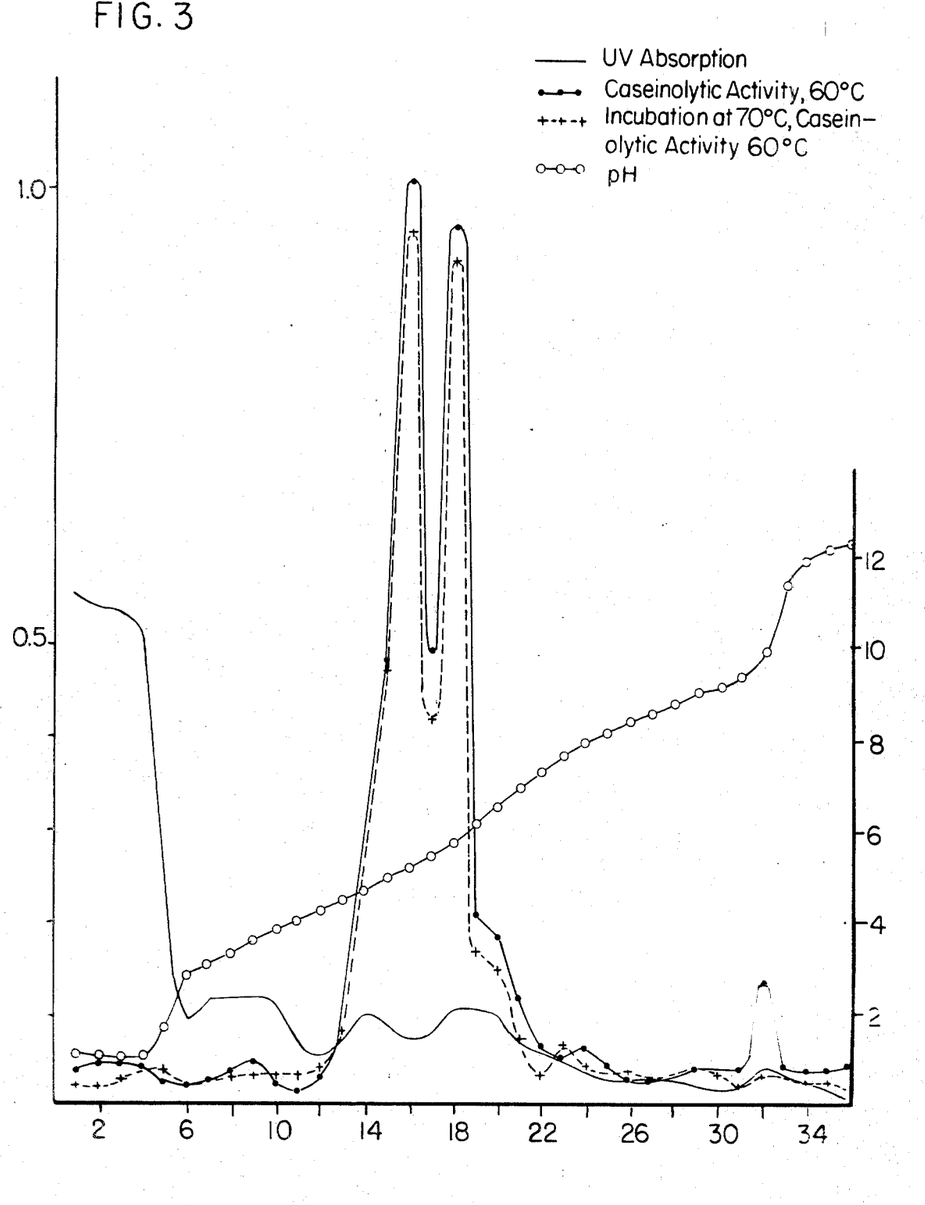
FIG. 3 relates to the isoelectric separation according to our invention of heat stable material purified by chromatography on DEAE cellulose (material eluted with 0.01 molar $NH_4CH_3COO$ was used for the isoelectric separation).

Table 7 shows the temperature optimum of the thermostable fractions 16, 18 and not thermostable fraction 31 obtained at the isoelectric separation (see FIG. 2 and FIG. 3). Casein at pH 7.4 was used as substrate for the activity determinations.

TABLE 7.—TEMPERATURE OPTIMUM OF FRACTIONS OBTAINED BY ISOELECTRIC SEPARATION

| Temperature, °C. | Percent of maximum activity | | |
|---|---|---|---|
| | Fraction 16, FIG. 3 | Fraction 18, FIG. 3 | Fraction 31, FIG. 2 |
| 37 | 6 | 5 | 5 |
| 50 | 12 | 13 | 13 |
| 60 | 47 | 37 | 44 |
| 70 | 70 | 70 | 100 |
| 80 | 100 | 100 | 38 |
| 90 | 37 | 31 | |
| 100 | 23 | 27 | |

Table 8 shows the pH optimum of the thermostable fractions 16, 18 and not thermostable fraction 31 obtained at the isoelectric separation (see FIG. 2 and FIG. 3). Casein at pH 7.4 was used as substrate for the activity determinations.

TABLE 8.—pH OPTIMUM OF FRACTIONS OBTAINED BY ISOELECTRIC SEPARATION

| pH | Percent of maximum activity | | |
|---|---|---|---|
| | Fraction 16, FIG. 3 | Fraction 18, FIG. 3 | Fraction 31, FIG. 2 |
| 6 | | | 58 |
| 7 | 32 | 95 | 67 |
| 8 | 45 | 92 | 74 |
| 9 | 100 | 100 | 80 |
| 10 | 54 | 83 | 86 |
| 11 | 58 | 76 | 100 |

Figure 1A:
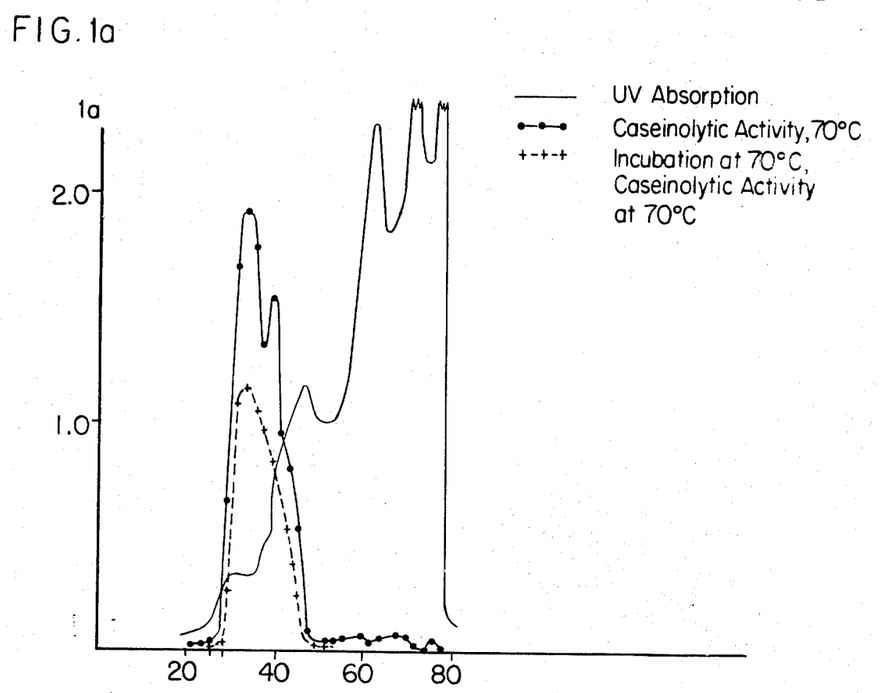
FIG. 1a shows results of gel filtration of 300 mg. of crude product of our invention.

FIG. 1a shows the results of gel filtration of 300 mg. of the crude product obtained at the isolation of the enzyme preparation using Sephadex® G-50 2 x 112 cm. The elution was carried out with $H_2O$ at a rate of 2 fractions of 4.5 ml. each per hour.

Figure 1B:
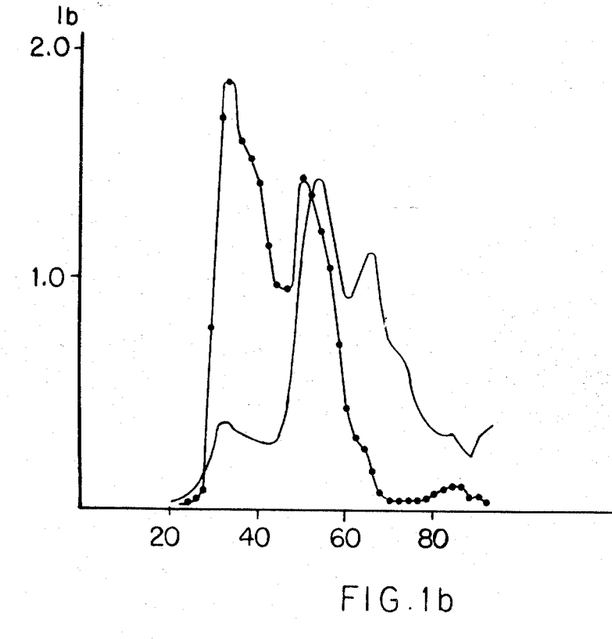
FIG. 1b shows results of gel filtration of 500 mg. of first acetone precipitate of the heated crude product of our invention.

FIG. 1b shows the results of gel filtration of 500 mg. of the first acetone precipitate from heat treated crude product.

From FIGS. 1a and b it is seen that material fractionated by gelfiltration of the first acetone precipitate contains proteolytic material not present in the crude material. This finding shows that heating of the crude material except from denaturing proteolytic enzymes and other proteins induces the formation of proteolytic activity with different properties. The results according to Tables 4 and 5 indicate that heating the crude product at 65–70° C. at pH 7–8 for certain time intervals will slightly increase its proteolytic activity in comparison with a shorter period of heating the crude enzyme solution.

PURIFICATION OF HEAT STABLE PRODUCT

Through a column filled with 50 g. DEAE cellulose equilibrated with 0.01 molar $NH_4CH_3COO$ at pH 7.4, 2.7 g. of the first acetone precipitate dissolved in 35 ml. buffer was filtered. 10 ml. fractions were collected. When no more UV absorbing material and no more proteolytic activity was eluted the low ion strength was increased to 0.1 M $NH_4CH_3COO$ and some UV absorbing and proteolytic material was eluted. Thereafter the pH was lowered to pH 5.5 when very little UV absorbing and proteolytic activity was eluted. The results are collected in Table 9.

TABLE 9

| Fraction | Weight, mg. | 37° C., pH 7.4 casein, units/mg. | Activity remaining after heating at 70° C. 30 min., percent |
|---|---|---|---|
| Starting material, acetone precipitate | 2,700 | 0.3 | 65 |
| Eluted with 0.01 M $NH_4CH_3COO$ pH 7.4, first part | 430 | 0.4 | 90 |
| Eluted with 0.01 M $NH_4CH_3COO$ pH 7.4, second part | 135 | 0.6 | 85 |
| Eluted with 0.1 M $NH_4CH_3COO$ pH 7.4 | 320 | 0.05 | 50 |
| Eluted with 0.1 M $NH_4CH_3COO$ pH | <20 | ------ | 77 |

The crude product and the first part of material eluted from DEAE cellulose at pH 7.4 and with 0.01 molar $NH_4CH_3COO$ was investigated by iso-electric separations with a pH gradient from 3 to 10. The results are collected in FIGS. 2 and 3.

The crude product, FIG. 2, contains several proteolytically active enzymes. At least seven enzymes active towards casein at pH 7 can be seen. Three of them are dominating. One having an iso-electric point at 5, the other at 5.5 and the third at pH 10 to 11. The material migrating to a pH between 4–6 contains thermostable enzymes.

The material purified by ion exchange chromatography is built up by essentially two thermostable enzymes having isoelectric points of 5.2 and 5.7 (FIG. 3). The pH optimum and temperature optimum of those two enzyme preparations fraction 16 and 18 (FIG. 3) and the thermolabile fraction 31 (FIG. 2) were determined in Tables 7 and 8.

From FIGS. 2 and 3 it is seen that practically no degradation of the thermostable material occurs at 70° C. but that all activity of the thermolabile enzyme will disappear under the same conditions.

The influence of cobalt ions ($Co^{2+}$) on the proteolytic activity in various fractions obtained at isoelectric focusing of the crude product and the enzymatic activity of such fractions on various synthetic substrates was studied.

The fractions from the isoelectric separations were dialyzed over night. Suitable amounts of the dialyzed fractions were used to determine the activity against benzoyl-D,L-argininenaftylamide (BANA), carbobenzoxyglycine-L-leucylamide, carbobenzoxy-L - glutamyl-L-tyrosine, carbobenzoxy-L-leucyl-p-nitrophenylester, carbobenzoxyglycine-L-phenylalanine, L-leucin-glycine and casein at pH 7.4 and pH 10.0.

The measurements when using BANA as substrate was essentially as described by Reidel and Wünsch Seit-Phys. Chem., 316 61 (1959) and Blackwood and Mandl. Anal. Biochem., 2, 370 (1961).

The measurements when using L-leucin-glycine (L-leu-gly), carbobenzoxy - glycine - L - phenylalanine (Z-gly-L-phe), carbobenzoxy - L - glutamyl - L - tyrosine (Z-gly-L-tyr), carbobenzoxy - L - leucylamide (Z-gly-leu-amide) as substrates were determined with ninhydrin reaction of the incubates after 30 minutes incubation at 37° C. of the enzyme solution and the appropriate substrate. As blanks, enzyme plus ninhydrin solution plus substrate were used.

The measurements when using carbobenzoxy-L-leucyl-p-nitrophenylester (Z-leu-p-nitrophenylester) were performed by measuring the optical density at 405 nm. of the incubate of the enzyme and the ester for 15 minutes. As blanks, solutions not containing the enzyme were used.

The concentration of $Co^{+2}$ was 0.1 molar. 0.1 ml. of this solution was added to the enzyme solution. This mixture was allowed to stand 10 minutes before the substrate was added.

The results are collected in Table 10.

As buffer, 0.2 M tris (hydroxymethyl)-aminomethane of pH 7.4 and 10.0 was used.

TABLE 11—EFFECT ON CASEINOLYTIC ACTIVITY BY METALS AND INHIBITORS

| | Change of proteolytic activity (percent) | | | |
|---|---|---|---|---|
| | Buffer pH 7.4 | | Buffer pH 10.0 | |
| Added material | Crude product | First acetone precipitate | Crude product | First acetone precipitate |
| 0.03 M $Mn^{2+}$ | −30 | −10 | −80 | −50 |
| 0.03 M $Zn^{2+}$ | −60 | −20 | −70 | −20 |
| 0.03 M $CO^{2+}$ | −30 | −10 | −50 | −50 |
| 0.03 M $Ca^{2+}$ | ±0 | ±0 | −10 | −10 |
| 0.03 M $Mg^{2+}$ | ±0 | ±0 | ±0 | +40 |
| 0.1 ml Trasylol ® | −10 | ±0 | ±0 | |
| 0.03 M EDTA | −80 | −20 | −80 | ±0 |
| 0.1 ml phenylmethylsulphonyl fluoride (0.5%) | −30 | −70 | −10 | −10 |
| EDTA plus phenylmethylsulphonylfluoride | −90 | −80 | −80 | −50 |

TABLE 10.—ACTIVITY WITH AND WITHOUT $Co^{+2}$ OF FRACTIONS OBTAINED BY ISOELECTRIC FOCUSING OF THE CRUDE PRODUCT (FIG. 2)

| Fraction tube No. | Casein, pH 7.4 | Casein, pH 10.0 | Bz-DL-arg-naft-$NH_2$ | Z-gly-L-leu-$NH_2$ | | Z-L-gly-L-tyr-OH | | Z-L-leu-nitro-phenol | | Z-gly-L-phe-OH | | L-leu-gly-OH | |
|---|---|---|---|---|---|---|---|---|---|---|---|---|---|
| | | | | (1) | (2) | (1) | (2) | (1) | (2) | (1) | (2) | (1) | (2) |
| 7–9 (I) | 30 | 12 | 82 | 0 | 100 | 0 | 7 | 14 | 10 | 0 | 0 | 17 | 60 |
| 12–13 (II) | 195 | 44 | 12 | 325 | 1,560 | 80 | 183 | 72 | 90 | 7 | 45 | 0 | 0 |
| 15–16 (III) | 308 | 275 | 6 | 465 | 2,340 | 25 | 58 | 15 | 75 | 5 | 20 | 0 | 1,350 |
| 18–19 (IV) | 393 | 245 | 4 | 530 | 1,990 | 635 | 1,090 | 115 | 115 | 105 | 283 | 70 | 650 |
| 24–26 (V) | 52 | 29 | 6 | 0 | 225 | 17 | 2 | 27 | 28 | 0 | 10 | 5 | 10 |
| 28–29 (VI) | 61 | 55 | 14 | 0 | 40 | 0 | 10 | 120 | 135 | 0 | 0 | 0 | 80 |
| 30–32 (VII) | 154 | 122 | 0 | 0 | 57 | 0 | 12 | 380 | 325 | 10 | 10 | 320 | 455 |

1 Without $Co^{2+}$.
2 With $Co^{2+}$.

It is seen in Table 10 that the activity against casein at pH 7.4 was highest in the fractions IV and III but that the activity was present in all fractions. The activity against casein at pH 10.0 was highest in fraction III and was high also in fraction IV. The activity against (benzoyl-D,L-arginine-naftylamide) which is present only in the crude product, is found in fraction I. The activity against Z-L-leucyl-p-nitrophenylester which is not affected by $Co^{2+}$ but is inhibited by FMSF (phenylmethylsulphonylfluoride) is present in all fractions but was highest in fraction VII. The activity against L-leucine-glycine, which strongly requests $Co^{2+}$ or $Me^{2+}$ (two-valent metal ions), and is enhanced by $Co^{2+}$, is highest in fraction III. The activity in fraction VII is not as strongly influenced by $Co^{2+}$. The activity against Z-gly-L-phenylalanine, which is strongly affected by $Co^{2+}$, is highest in fraction IV. This activity is present only in the crude product. The activity against Z-L-gly-L-tyrosin, which requests $Me^{2+}$ and is somewhat enhanced by $Co^{2+}$, is present in fraction IV. The neutral proteolytic activity, e.g., the activity against Z-gly-L-leu-$NH_2$, which is very strongly enhanced by $Co^{2+}$, is about the same in fractions II, III and IV, but is highest in fraction II.

The various peaks obtained at the isoelectric separations thus will contain mainly the following activities:

Fraction No. 7–9.—activity against benzoyl-D,L-arginine naftylamide
Fraction No. 12–13.—activity against Z-gly-L-leu-$NH_2$
Fraction No. 15–16.—activity against L-leu-gly and Z-gly-L-leu-$NH_2$
Fraction No. 18–19.—activity against Z-gly-L-fenylalanine
Fraction No. 30–32.—activity against L-leu-p-$NO_2$.

The effect on the caseinolytic activity by adding various metals and inhibitors for the crude product and the heat stable enzyme preparations was studied. The enzyme preparation, dissolved in 3 ml. buffer, was incubated with 0.1 ml. of a 0.1 M solution of the metal to be tested, resp. and ethylenediamine tetraacetic acid (0.1 M), phenylmethylsulphonylfluoride solution (0.5%) or 0.1 ml. of a Trasylol® solution. The incubation time was 10 min. at 37° C. Thereafter, 3 ml. of a casein solution was added and the proteolytic activity determined. The results are collected in Table 11. The activity was compared with the activity in control samples without added material.

The proteolytic activity against casein was determined mainly as described by Bergkvist, Acta Chem. Scand, 17 (1963), 1521–1540. 15 g. of casein (Merck, Hammarsten casein) was suspended in 400 ml. of water under vigorous stirring. Sodium hydroxide was added until dissolution. The pH was adjusted to the desired pH and the solution was diluted to 500 ml. with water. 3 ml. of casein solution was mixed in test tubes with 3 ml. of Theorell-Stenhagen buffer (Biochemische Taschenbuch ed. Rouen H. M. Springer Verlag (1956), 651) of the desired pH.

Parallels of the test tubes were equilibrated at the appropriate temperature in water baths. A suitable amount of the dissolved enzyme was added to the test tubes. From one of the parallels 2 ml. were pipetted immediately into 3 ml. of 10% trichloroacetic acid. The other set of test tubes were incubated for exactly 30 minutes whereafter 2 ml. were withdrawn and added to 3 ml. 10% trichloroacetic acid. After standing for at least 30 minutes at room temperature, the tubes were centrifuged and filtered through small funnels stoppered with a loose plug of cotton. The optical density at 280 mm. of the filtered centrifugates was measured.

The activity of the enzyme expressed in casein units per mg. (c.u. per mg.) was obtained in the following way:

Optical density of incubated sample minus optical density of unincubated sample divided by amount of enzyme in test tubes (expressed in mg.).

When investigating the stability of the enzyme, the enzyme was dissolved in buffer and incubated without casein for a preset time at a preset temperature. Thereafter, the caseinase determinations were performed at desired pH and tempearture.

In the determination of proteolytic activity using N-α-tosyl-L-arginine-ethylester (TAEE) as substrate, the following chemicals were used in the final solution: TAEE in a concentration of 0.05 molar, and NaCl 0.9%. Amount of enzyme solution added was 0.2 ml., and the volume of the test solution was 10 ml. The titration was performed with 0.05 molar NaOH using automatic titration, radiometer titration assembly type TTA 4.

Gel filtration was carried out using Sephadex® columns under the conditions set forth in the figure legends above.

The following examples further illustrate this invention but are not intended to be limitative upon its scope. The microorganism denoted Astra strain 19 has been deposited in the following culture collection: ARS Culture Collection Investigations, Fermentation Laboratory, U.S. Department of Agriculture, Northern Utilization Research and Development Division, 1815 N. University St., Peoria, Ill. 61604, U.S.A. (Astra strain 19 is used in the following examples.) In depositing the microorganism was assigned the numerical designation NRRL 3762. The following stipulation was made in connection with the deposition:

"As of February 10, 1970, the subject culture will be made available to anyone who requests the same."

EXAMPLE 1

To each of three series of 500 ml. Erlenmeyer flasks were added 100 ml. of one of the following media:

(I)

| | | |
|---|---|---|
| Pharmamedia® | g | 20 |
| Sucrose | g | 24 |
| $KH_2PO_4$ | g | 13.5 |
| Tap water | ml | 1000 |

(II)

| | | |
|---|---|---|
| Corn meal | g | 20 |
| Soybean meal | g | 20 |
| $KH_2PO_4$ | g | 13.5 |
| Tap water | ml | 1000 |

(III)

| | | |
|---|---|---|
| Starch | g | 30 |
| Spray dried bovine blood | g | 15 |
| $KH_2PO_4$ | g | 13.5 |
| Tap water | ml | 1000 |

(IV)

| | | |
|---|---|---|
| Soybean meal | g | 35 |
| Starch | g | 24 |
| $KH_2PO_4$ | g | 13.6 |

(V)

| | | |
|---|---|---|
| Actiferment® | g | 25 |
| Sucrose | g | 35 |
| $KH_2PO_4$ | g | 13.6 |

(VI)

| | | |
|---|---|---|
| Soybean meal | g | 24 |
| Gelatine | g | 10 |
| Sucrose | g | 20 |
| $KH_2PO_4$ | g | 13.6 |

(VII)

| | | |
|---|---|---|
| Corn steep liquor | g | 30 |

(VIII)

| | | |
|---|---|---|
| Oat flour | g | 30 |
| $KH_2PO_4$ | g | 13.6 |

(IX)

| | | |
|---|---|---|
| Soybean meal | g | 15 |
| Corn steep liquor | g | 40 |
| $KH_2PO_4$ | g | 13.6 |

(X)

| | | |
|---|---|---|
| Scotaferm® | g | 50 |
| Molasses | g | 40 |

$H_2O$ added to 1000 ml.
pH 6.8 before sterilization of the culture medium.

The flasks were autoclaved at 120° for 20 min. after the pH had been adjusted to 6.8. After cooling, the flasks were inoculated with an aqueous suspension of the organism stated in Table 12, obtained from conventional nutrient agar slants. The incubation was carried out at a temperature of 26–30° and was stopped after 113 hours, or when the proteolytic activity had passed through a maximum. The results are given in Table 12.

TABLE 12

| Organism | Activity, given as casein units per ml. of thermostable component containing solution obtained from medium No. — | | | | | | | | | |
|---|---|---|---|---|---|---|---|---|---|---|
| | I | II | III | IV | V | VI | VII | VIII | IX | X |
| Astra strain 19 | 4.6 | 2.0 | 0.1 | 0.8 | 0.2 | 0.3 | 0.2 | 4.6 | 0.3 | 7.5 |

EXAMPLE 2

Pharmamedia® (100 g.), sucrose (150 g.), $KH_2PO_4$ (70 g.), antifoam RD-emulsion (1 ml.) lard oil (17 ml.), paraffin oil (2.6 ml.) and cetanol (0.4 g.) in tap water (5 l.) was adjusted to pH 6.8 with sodium hydroxide (15 ml.) and sterilized at 124° for 30 minutes in a fermentation seed tank. The nutrient medium was inoculated with 100 ml. of a 24 hours culture of *Streptomyces globisporus* and inoculated at 28° C. with aeration and agitation for 24 hours.

Pharmamedia® (1000 g.), sucrose (1500 g.), $KH_2PO_4$ (700 g.) antifoam RD-emulsion (5 ml.), lard oil (40 ml.), paraffin oil (6 ml.) and cetanol (4 g.) in tap water (50 l.) was adjusted to pH 6.8 with 45% sodium hydroxide (150 ml.) and the solution was sterilized in a fermentation tank at 124° C. for 30 minutes. The nutrient medium was cooled and inoculated with the above-mentioned seed culture and subsequently incubated at 28° C. with agitation and aeration. After 140 hours when the proteolytic activity was estimated to 6.1 c.u./ml. the fermentation broth was cooled.

EXAMPLE 3

Pharmamedia® (100 g.), sucrose (150 g.), $KH_2PO_4$ (70 g.), antifoam RD-emulsion (1 ml.), lard oil (17 ml.) paraffin oil (2.6 ml) and cetanol (0.4 g.) in tap water (5 l.) was adjusted to pH 6.8 with sodium hydroxide (15 ml.) and sterilized at 124° C. for 30 minutes in a fermentation seed tank. The nutrient medium was inoculated with 100 ml. of a 24 hours culture of *Streptomyces globisporus* and inoculated at 28° C. with aeration and agitation for 24 hours.

Pharmamedia® (3000 g.), sucrose (4500 g.), $KH_2PO_4$ (2100 g.), antifoam RD-emulsion (15 ml.), lard oil (120 ml.), paraffin oil (18 ml.) and cetanol (12 g.) in tap water (150 ml.) was adjusted to pH 6.8 with 45% sodium hydroxide (about 450 ml.) and sterilized at 124° C. for 30 minutes. The nutrient medium was cooled and inoculated with the above mentioned seed culture and subsequently incubtaed at 28° C. with agitation and aeration. After 136 hours when the proteolytic activity was estimated to 5.5 c.u./ml., the fermentation broth was cooled.

EXAMPLE 4

The fermentation experiment was carried out according to Example 2. After 140 hours the proteolytic activity was estimated to 5.2 c.u./ml. and the fermentation broth was cooled.

EXAMPLE 5

Isolation of the enzyme preparation

For the isolation of the enzyme preparation from the fermentation broth obtained in Example 2, the broth was separated in a centrifugal separator and after the separator the solution was clarified in a Seitz filter press-sheets 3/1250. The clear solution (45 l., activity 6.0 c.u./ml.) was evaporated in a thin film evaporator at 15° C. to 8 l., activity 34 c.u./ml.

The solution was dialyzed against tap water 24 hours and spray-dried yielding 210 g. with an activity of 0.9 c.u./mg. It can be used in detergent compositions.

EXAMPLE 6

For the isolation of the enzyme preparation from the fermentation broth obtained in Example 3, the broth was separated in a centrifugal separator and after the separation the solution was clarified in a Seitz filter press-sheets 3/1250. The clear solution (120 l., activity 4.8 c.u./ml.) was evaporated in a thin film evaporator at 15° C. to 17.5 l., activity 38 c.u./ml. The solution was cooled and acetone (13 l.) with a temperature of −10° C. was added during stirring. After stirring for 30 minutes, the precipitated material was removed by centrifugation in a Sharples centrifuge.

The clear solution was evaporated in a thin film evaporator at 15° C. to 11.8 l., activity 60.5 c.u./ml.

The solution was spray-dried yielding 525 g. with an activity of 0.50 c.u./mg.

EXAMPLE 7

For the isolation of the enzyme preparation from the fermentation broth obtained in Example 4, the broth was separated in a centrifugal separator and after the separation, the solution was clarified in a Seitz filter press-sheets 3/1250. The clear solution (137 l. activity 5.2 c.u./ml.) evaporated in a thin film evaporator at 15° C. to 16.0 l., activity 47.5 c.u./ml. The solution was cooled to about +10° C. and acetone (8 l.) with a temperature −10° C. was added during stirring. After stirring for 30 minutes, the precipitated material was removed by centrifugation in a Sharples centrifuge.

The clear solution was evaporated in a thin film evaporator at 10–15° C. to 8.3 l., activity 81.5 c.u./ml.

After desalting on Sephadex® G 25 coarse in a column K 100/100 (Pharmacia, Uppsala, Sweden) the volume was reduced to 2.3 l. at +15° C. in a thin film evaporator. The activity was 286 c.u./ml.

The solution was spray-dried yielding 289 g. with an activity of 1.9 c.u./mg.

EXAMPLE 8

Preparation of heat stable component 25 g. of a spray-dried sample of culture filtrate from Astra strain 19 denoted "crude product" in this specification, protease activity 0.56 casein units per mg. was dissolved in 500 ml. of H₂O at 60° C. and kept at that temperature for 30 minutes. After cooling the solution was centrifuged. The clear supernatant was mixed with 1000 ml. of ice cooled acetone. The precipitate, denoted "first acetone precipitate" in this specification, was removed by centrifugation. To the clear top solution a further amount of 750 ml. acetone was added and the resulting mixture was centrifuged. The precipitate thus obtained is denoted "second acetone precipitate" in this specification. The precipitates were dissolved in water and freeze-dried. The results obtained at tests on the two acetone precipitates, on a spray-dried sample of culture filtrate, denoted "crude product" and on a crude product incubated at 60° C. for 30 minutes, are collected in Table 13.

EXAMPLE 9

Preparation of heat stable component

The procedure according to Example 8 was repeated using 10 g. spray-dried sample of culture filtrate and incubating at 65° C. The results obtained are collected in Table 13.

TABLE 13

| Substance | Weight | Proteolytic activity | Total proteolytic activity c.u. |
|---|---|---|---|
| Crude product Example 8 | 25 g. | 0.56 c.u./mg. | 14,000 |
| Crude product Example 9 | 10 g. | 0.56 c.u./mg. | 5,600 |
| Crude product incubated at 60° C. for 30 minutes, Example 8 | 25 g./500 ml. | 7.8 c.u./ml. | 3,900 |
| Crude product incubated at 65° C. for 30 minutes Example 9 | 10 g./500 ml. | 1.6 c.u./ml. | 800 |
| First acetone precipitate, Example 8 | 5.6 g. | 0.39 c.u./mg. | 2,200 |
| First acetone precipitate, Example 9 | 3.9 g. | 0.26 c.u./mg. | 1,000 |
| Second acetone precipitate, Example 8 | 3.2 g. | 0.57 c.u./mg. | 1,800 |
| Second acetone precipitate, Example 9 | 1.0 g. | 0.15 c.u./mg. | 150 |

NOTE.—C.U.=Casein units.

It is seen in Table 13 that heating of the crude protease solution for 30 minutes at 65° C. will cause a considerable loss in total proteolytic activity. In the experiments recorded in the table the actual loss of activity is around 85%. The remaining activity can be precipitated by addition of, for instance, acetone.

The first acetone precipitate is enriched in proteolytic activity having a higher temperature optimum and to a certain extent better heat stability than the second acetone precipitate, as well as the crude protease mixture, as is evident at an inspection of Tables 2 and 3, wherein these properties of the first acetone precipitate are clearly demonstrated.

It is seen in Table 1 that the pH optimum as measured against casein is similar for the crude product, the first acetone precipitate and the second acetone precipitate. The optimum value appears to be pH 9 to 10. Both the first acetone precipitate and the second acetone precipitate can be used as agents for cell lysis and in solubilization of biopolymers.

Besides acetone also other organic solvents such as ethanol, propanol and other alcohols and the like as well as salts such as ammonium sulphate and the like, may be used for the precipitation of the heat stable enzyme preparation. The heating period for the aqueous solution of the enzyme mixture may be extended up to about two hours at a temperature of about 55–75° C. By this heating procedure a proteolytic activity which is not present in the original enzyme preparation is induced.

Compatibility of the enzyme preparation with detergent compositions

Three commercially available detergent compositions were used; one containing perborates and about 40–50 percent (w./w.) phosphate; one containing about 7 percent (w./w.) phosphate and no perborate; and one soap detergent containing about 5 percent (w./w.) phosphate. The pH optimum of proteolytic activity, the pH stability of proteolytic activity, the temperature optimum of proteolytic activity, and the heat stability of the crude product enzyme preparation were investigated.

(A) pH-optimum of caseinolytic activity of the crude product enzyme preparation in combination with detergent compositions The following solutions were prepared: One solution containing 5 g. detergent composition in 100 ml. water (detergent solution). One solution containing 5 mg. crude product enzyme preparation per ml. water (enzyme solution). One 3% casein solution.

pH was adjusted using Teorell-Stenhagen buffer solution.

2 ml. buffer solution of the desired pH and 1 ml. detergent solution were mixed with 3 ml. casein solution. The resulting solution was tempered at 37° C. whereafter 0.1 ml. of the enzyme solution was added and the caseinolytic activity measured.

For comparison a blank solution containing no detergent was tested. The results are collected in Table 14.

TABLE 14.—CASEINOLYTIC ACTIVITY OF THE CRUDE PRODUCT ENZYME PREPARATION IN COMBINATION WITH DETERGENT COMPOSITION

| | Caseinolytic activity, percent of maximal activity, of the detergent composition with a phosphate contents of— | | | |
|---|---|---|---|---|
| pH | 40–50% | 7% | 5% | Blank solution |
| 6.0 | 70 | 58 | 55 | 38 |
| 6.5 | 82 | | 60 | |
| 7.0 | 82 | 74 | 91 | 61 |
| 7.5 | 88 | | 90 | |
| 8.0 | 92 | 90 | 95 | 82 |
| 8.5 | 100 | | 93 | |
| 9.0 | 92 | 100 | 99 | 100 |
| 9.5 | 92 | | 100 | |
| 10.0 | 80 | 45 | 85 | 89 |
| 10.5 | 45 | | 55 | |
| 11.0 | | 9 | | 31 |

(B) pH stability of the crude product enzyme preparation in combination with detergent compositions Solutions identical to those according to test A above were used. 2 ml. buffer solution and 1 ml. detergent solution were mixed. Thereafter 0.1 ml. of the enzyme solution was added and the solution thus obtained incubated for 30 minutes at 37° C., whereafter the caseinolytic activity was measured at pH 7.4 and 37° C. The results are shown in Table 15.

TABLE 15.—INFLUENCE OF pH ON STABILITY OF THE CRUDE PRODUCT ENZYME PREPARATION IN COMBINATION WITH DETERGENT COMPOSITIONS

| | Caseinolytic activity, percent of maximal activity, of the detergent composition with a phosphate contents of— | | | |
|---|---|---|---|---|
| pH | 40–50% | 7% | 5% | Blank solution |
| 2.0 | 5 | 6 | 7 | 4 |
| 3.0 | 9 | 12 | | 4 |
| 4.0 | 14 | 54 | 91 | 37 |
| 5.0 | 87 | 65 | | 70 |
| 6.0 | 100 | 99 | 100 | 97 |
| 7.0 | 60 | 85 | 91 | 100 |
| 8.0 | 33 | 100 | 42 | 93 |
| 9.0 | 30 | 63 | 25 | 90 |
| 10.0 | 27 | 28 | 20 | 50 |
| 11.0 | 27 | 23 | 18 | 14 |

(C) Temperature optimum of caseinolytic activity of the crude product enzyme preparation in combination with detergent compositions The detergent solution and casein solution used were identical with those described under (A) above. A crude product enzyme solution containing 3 mg. crude product enzyme preparation was used. Adjustment of pH was carried out using 0.2 M phosphate buffer for adjustment to pH 7.4 and Teorell-Stenhagen buffer for adjustment to pH 9.0.

2 ml. buffer solution and 1 ml. detergent solution were mixed with 3 ml. casein solution and tempered for 3 minutes in water-bath at the desired temperature. Thereafter 0.1 ml. enzyme solution was added and the caseinolytic activity determined. The results are collected in Table 16.

TABLE 16.—TEMPERATURE OPTIMUM OF CASEINOLYTIC ACTIVITY OF THE CRUDE PRODUCT PREPARATION IN COMBINATION WITH DETERGENT COMPOSITIONS

| Temp. °C. | Caseinolytic activity, percent of maximal activity, of the detergent composition with a phosphate contents of— | | | | | | | |
|---|---|---|---|---|---|---|---|---|
| | 40–50% | | 7% | | 5% | | Blank solution | |
| | pH 7.4 | pH 9.0 | pH 7.4 | pH 9.0 | pH 7.4 | pH 9.0 | pH 7.4 | pH 9.0 |
| 20 | 18 | 28 | 20 | 54 | 36 | 30 | 29 | 35 |
| 37 | 39 | 58 | 47 | 86 | 45 | 76 | 28 | 45 |
| 50 | 70 | 96 | 71 | 95 | 52 | 50 | 77 | 100 |
| 60 | 100 | 87 | 100 | 100 | 87 | 82 | 100 | 70 |
| 70 | 87 | 100 | 71 | 93 | 100 | 100 | 80 | 77 |
| 80 | 82 | 85 | | 78 | 65 | 99 | 85 | 78 |

D. Heat stability of the crude product enzyme preparation in combination with detergent compositions Solutions identical to those according to test (C) were used. 2 ml. buffer solution and 1 ml. detergent solution were mixed with 0.1 ml. enzyme solution and the resulting solution incubated for 30 minutes at the desired temperature, whereafter the caseinolytic activity was determined at 37° C. The results are collected in Table 17.

TABLE 17.—HEAT STABILITY OF THE CRUDE PRODUCT ENZYME PREPARATION IN COMBINATION WITH DETERGENT COMPOSITIONS

| Temp. °C. | Caseinolytic activity, percent of maximal activity, of the detergent composition with a phosphate contents of— | | | | | | | |
|---|---|---|---|---|---|---|---|---|
| | 40–50% | | 7% | | 5% | | Blank solution | |
| | pH 7.4 | pH 9.0 | pH 7.4 | pH 9.0 | pH 7.4 | pH 9.0 | pH 7.4 | pH 9.0 |
| 20 | 100 | 100 | 100 | 100 | 100 | 100 | 100 | 100 |
| 37 | 36 | 71 | 99 | 71 | 84 | 55 | 95 | 74 |
| 50 | 25 | 34 | 70 | 35 | 47 | 54 | 87 | 13 |
| 60 | 9 | 2 | 31 | 21 | 15 | 22 | 20 | 10 |
| 70 | 3 | 2 | 15 | 10 | 4 | 7 | 15 | 7 |
| 80 | 2 | 0 | 4 | 0 | 2 | 0 | 13 | 2 |

(E) The relative caseinolytic activity of the crude product enzyme preparation in combination with detergent compositions compared to the caseinolytic activity obtained without any addition of detergent compositions was measured. The results are collected in Table 18.

TABLE 18

Relative caseinolytic activity of the crude product enzyme preparation

Type of detergent:  Relative caseinolytic activity

Phosphate contents 40–50%; containing perborate ______________________________ 89

Phosphate contents 7% ________________ 107

Phosphate contents 5% (soap detergent) _____ 130

No detergent added ___________________ 100

The test results shown in Tables 14–18 establish that the enzyme preparation of the present invention is compatible with detergent compositions with high (40–50% w./w.) as well as low (5–10% w./w.) phosphate which may also contain perborates as optical brighteners. The results also show that the enzyme preparation is compatible with soap detergents. The heat stability seems to be slightly affected by a high phosphate or perborate contents but the temperature optimum, as is seen in Table 16, is substantially unaffected by the presence of detergent compositions.

We claim:

1. A novel enzyme preparation obtained from a new strain of *Streptomyces globisporus* (NRRL 3762) characterized in
   (a) being a mixture of proteins;
   (b) being soluble in water, saline solutions and conventional buffer solutions;
   (c) being stable and retaining its enzymatic activity at room temperature for more than a year in dry powder form;
   (d) its ultraviolet absorption spectrum being that characteristic of proteins containing aromatic amino acids;
   (e) being proteolytically active against casein, hemoglobin and gelatin;
   (f) having a proteolytic optimum with casein as substrate at pH 9–10;
   (g) being able to hydrolyze N-α-toxyl-L-arginine ethyl ester (TAEE);
   (h) containing proteolytic activity being induced by heating;
   (i) containing esterases, lipases and amylases in addition to proteolytic enzymes;
   (j) the heat stable enzyme or enzymes being precipitable with organic solvents or ammonium sulphate;
   (k) its stability and activity being essentially independent of the concentration of calcium ions in a solution at elevated temperature;
   (l) the mixture having a temperature optimum with casein as substrate at about 60° C. at pH 7.4 and a temperature optimum at about 50° C. at pH 9.0;
   (m) the mixture having a temperature optimum with TAEE as substrate around 50° C. at pH 7.4.

2. Process for preparing a hydrolytic enzyme preparation characterized in
   (a) being a mixture of proteins;
   (b) being soluble in water, saline solutions and conventional buffer solutions;
   (c) being stable and retaining its enzymatic activity at room temperature for more than a year in dry powder form;
   (d) its ultraviolet absorption spectrum being that characteristic of proteins containing aromatic amino acids;
   (e) being proteolytically active against casein, hemoglobin and gelatin;
   (f) having a proteolytic optimum with casein as substrate at pH 9–10;
   (g) being able to hydrolyze N-α-toxyl-L-arginine ethyl ester (TAEE);
   (h) containing proteolytic activity being induced by heating;
   (i) containing esterases, lipases and amylases in addition to proteolytic enzymes;
   (j) the heat stable enzyme or enzymes being precipitable with organic solvents or ammonium sulphate;
   (k) its stability and activity being essentially independent of the concentration of calcium ions in a solution at elevated temperature;
   (l) the mixture having a temperature optimum with casein as substrate at about 60° C. at pH 7.4 and a temperature optimum at about 50° C. at pH 9.0;
   (m) the mixture having a temperature optimum with TAEE as substrate around 50° C. at pH 7.4;
   which comprises culturing the microorganism NRRL 3762, a strain of *Streptomyces globisporus*, in a nutrient medium under aerobic submerged conditions.

3. Process according to claim 2 wherein the nutrient medium contains an assimilable source of at least carbon, nitrogen or inorganic salt.

4. Process according to claim 2 wherein the temperature of the nutrient medium during fermentation is between about 26 and about 30° C.

5. Process according to claim 2 which includes the presence of anti-foaming agents.

6. Process according to claim 2 wherein the medium, prior to inoculation, has a pH between about 6.0 and about 7.5.

7. Process according to claim 2 wherein an enzyme preparation was recovered from the nutrient medium.

8. Process according to claim 7 wherein the recovery involves at least a centrifugation, dialysis or spray drying.

9. Process according to claim 7 wherein proteolytically active enzymes are further recovered from the enzyme preparation.

10. Process aicording to claim 9 wherein the recovery involves acetone precipitation.

11. Process according to claim 7 wherein the proteolytic activity of the recovered enzyme of claim 7 is further varied by heating.

12. Process according to claim 7 wherein the enzyme preparation is purified by ion exchange chromatography.

13. Process according to claim 9 wherein the recovery involves gel filtration.

14. Process according to claim 9 wherein the recovery involves isoelectric separation.

15. Process according to claim 9 wherein at least one of the recovered enzymes is purified by ion exchange chromatography.

16. A detergent composition containing the novel enzyme preparation according to claim 1.

References Cited

UNITED STATES PATENTS

| | | | |
|---|---|---|---|
| 3,519,570 | 7/1970 | McCarty | 195—63 X |
| 3,574,120 | 4/1971 | Siebert et al. | 195—63 X |
| 3,576,719 | 4/1971 | Murao | 195—62 |

LIONEL M. SHAPIRO, Primary Examiner

U.S. Cl. X.R.

195—65

UNITED STATES PATENT OFFICE
CERTIFICATE OF CORRECTION

Patent No. 3,684,658             Dated August 15, 1972

Inventor(s)  P.S. Delin et al

It is certified that error appears in the above-identified patent and that said Letters Patent are hereby corrected as shown below:

Col. 5, line 2, "arginine-ethyl-ethyl-ester (TAEE)"

should be --arginine-ethyl-ester (TAEE)--;

Col. 5, (Table 1) line 13, (second column) "16 should be --61--;

Cols. 5 and 6 (Table 3), under the heading "TAEE as substrate",

"pH 9.4" should be --pH 7.4--.

Col. 8 (Table 9), last line of table, "Eluted with 0.1 M

$NH_4CH_3COO$ pH" should be

--Eluted with 0.1 M $NH_4CH_3COO$ pH 5.5--.

Col. 9, line 56, "nine naftylamide" should be --nine-naftylamide--.

Col. 10, line 31, "17" should be underscored.

Col. 12, line 53, the word "incubated" has been misspelled.

Col. 13, line 36, before the word "evaporated" the word

--was--has been omitted.

Col. 18, line 34, the word "according" has been misspelled.

Signed and sealed this 23rd day of January 1973.

(SEAL)
Attest:

EDWARD M. FLETCHER, JR.
Attesting Officer

ROBERT GOTTSCHALK
Commissioner of Patents